United States Patent Office 3,428,495
Patented Feb. 18, 1969

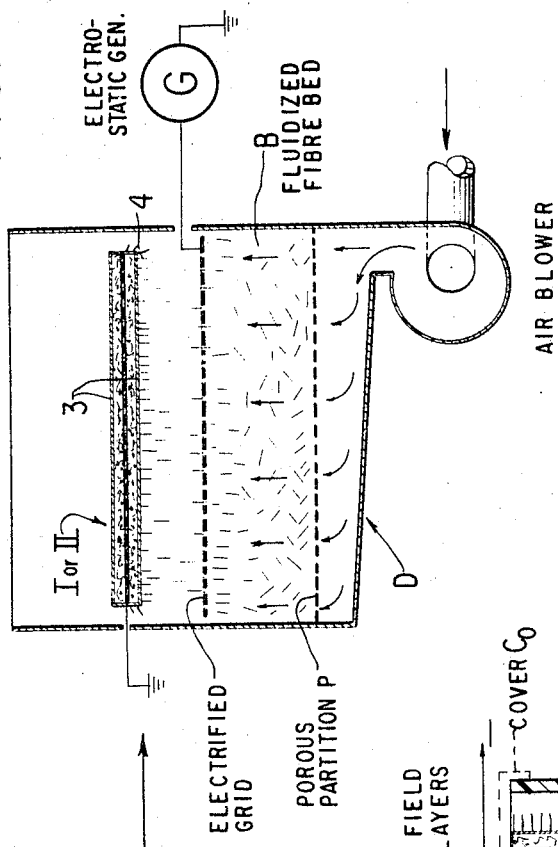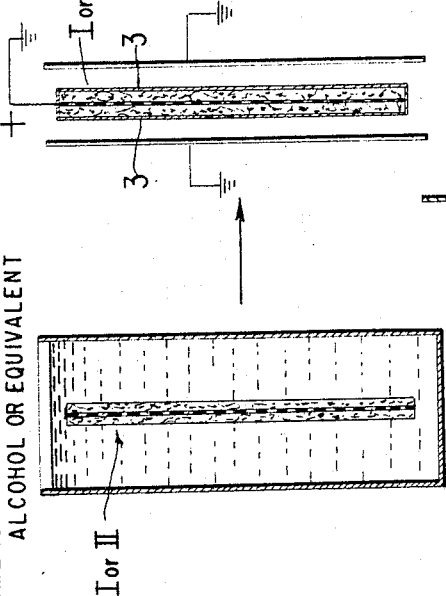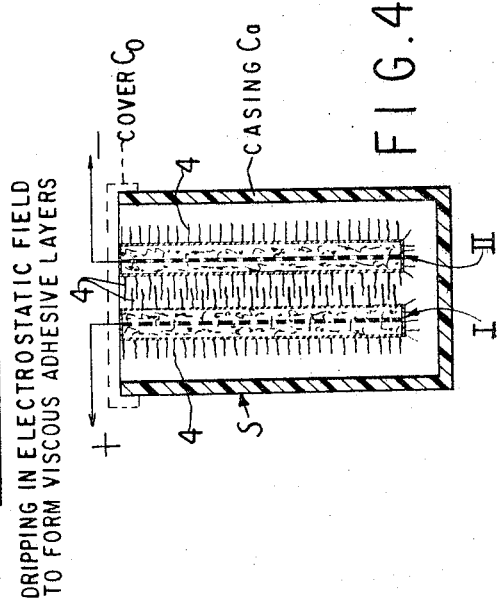

3,428,495
SEPARATOR ARRANGEMENTS FOR ELECTRO-CHEMICAL POWER SOURCES, METHODS OF THEIR MANUFACTURE AND POWER SOURCES EQUIPPED THEREWITH
Robert Marcel Deschamps, Paris, France, assignor to Societe des Accumulateurs Fixes et de Traction (Societe Anonyme), Romainville, France, a company of France
Filed Feb. 7, 1967, Ser. No. 614,501
Claims priority, application France, Feb. 23, 1966, 50,838
U.S. Cl. 136—143    14 Claims
Int. Cl. H01m 3/00; B01k 3/02

ABSTRACT OF THE DISCLOSURE

The disclosure is of electrode-separator arrangements wherein separators are directly affixed to the electrodes and comprise fibers of selected length and diameter oriented so that their lengths extend substantially perpendicular to the electrode faces and their ends are affixed as by adherance to such faces as by thin layers of adhesive material applied to the electrode faces. It also discloses a method of electrostatic deposition of such oriented fibres onto previously applied adhesive layers on the electrodes and discloses further electrochemical power sources equipped with such electrode separator arrangements, the purpose being to reduce internal resistances of such power sources to their lowest possible values, a particularly desirable result, since in the case of storage batteries with closely spaced electrodes enhanced flow of electrolysis products transferred by diffusion occurs. Also, production and assembly of such power sources is speeded at reduced cost.

There are no related applications of applicant currently pending in the United States.

Brief summary of invention

This invention primarily relates to electrochemical power sources comprising at least one positive electrode and one negative electrode insulated from each other by a separator, the assembly of these three parts being either in contact or impregnated with an electrolyte. More particularly, this invention can be applied to electrochemical power sources where the transfer of the electrolysis products evolved on an electrode at the end of the charge or on overcharge is made towards the electrode of opposite polarity and preferably in the dissolved state, i.e., where the distance between the electrodes does not exceed a few tenths of millimeters, being about 0.2 mm. and at most 0.3 mm. Such power sources, as it is well known, can be kept permanently sealed, which is of great interest specially for storage batteries.

Usually, the separator is constituted by a sheet of woven or felted plastic fibres. This relatively flexible and porous sheet is either cut to dimensions corresponding to those of the electrodes and inserted between them, or in the shape of a band wound or zig-zag folded around the electrodes.

It has already been proposed, in order to simplify the cell assembly in storage batteries, to form the separator on the electrode surface itself as a porous coating having a granular or fibrous structure. Thus, it has already been suggested to spray a granular plastic layer upon the electrode, for example, by means of a spraying gun. The linking of the plastic grains together or the linking of the same plastic grains with the electrode may be improved by the use of suitable solvents or by heating. It has also been proposed to flash and stick some plastic fibres parallel to the electrode surafce, by gun-spraying a solution of the same plastic material.

None of the above-mentioned techniques appear to have given satisfactory results.

Among the most important characteristics defining the use of a separator the thickness and the porosity must be more especially considered. The thickness of a separator once assembled, e.g., in a storage cell operating without any gas evolution, should not exceed 0.3 mm. in order to promote the transport of the electrolysis products at the end of the charge or during the overcharge, and to prevent any undesirable gas evolution. The variations of concentration occurring in the electrolysis around each electrode are caused by the transfer and discharge of the ions conducting the current. The magnitude of these concentration variations increases when the amount of electrolyte between the electrodes decreases, i.e., roughly when the distance between the electrodes is reduced. However, the diffusion of the electrolysis products and also the motion of the electrolyte itself, e.g., by convection both tend to compensate these variations in the concentration. Another cause of these variations is related to the amount of electrolyte situated between the electrode; this amount depending on the porosity of the separator medium for a given distance between the electrodes. The hydration of the active materials varies according to the state of charge or discharge and results in variations of concentration that relatively are all the greater as the amount of electrolyte is smaller and the capacity of the electrodes higher. Thus, in an alkaline storage cell, the ratio of water in the electrolyte increases during charge and decreases during discharge, so that if the separator does not contain enough electrolyte, the completion of discharge will be hampered through lack of water. Even if the amount of electrolyte is sufficient, the effect of concentration variations still exist and as a consequence a correlative variation of the internal resistance can be observed in the cells. Available separators presently in use though suitable for many applictions, may be unsatisfactory for high rate discharges on account of the mentioned concentration variations of the electrolyte. The data as to thickness and porosity are thus insufficient to define a separator medium particularly in the development of electrochemical power sources providing the highest possible power for a given energy. Some other parameters have to be taken into account, the importance of which has not yet been disclosed.

The inner resistance R of an electrochemical power source should always be reduced to the lowest possible value and the said value can be roughly divided into three terms:

$$R = R_r + R_p + R_c$$

$R_r$ being the ohmic resistance,
$R_p$ representing the losses per unit of current intensity due to polarization,
$R_c$ representing the losses per unit of current intensity due to concentration variations.

Conclusive steps have been taken to reduce $R_r$ and $R_p$, especially by the use of highly conductive electrolytes between very close electrodes. I have now found a means for a further reduction of the internal resistance in an operating power source, the said means consisting in acting upon the term $R_c$ by the use of a separator with a suitable structure.

It should be recalled, to make the problem clearer, that the passage of current and the variations in the amount of water from the charged state to the discharged state result in a heterogeneity in the electrolyte concentration, so that three different layers can be defined:

One layer adjacent to the anode, where the electrolyte is diluted because water is formed from the discharge of hydroxyl ions, One layer adjacent to the cathode, where, on the contrary, electrolyte is concentrated, and One intermediate layer.

These three layers are contained in the space between the electrodes, partly filled by the separator medium. It may happen that the intermediate layer is very thin and even non-existant, but anyway the concentration gradient is always substantial and leads to an increase of the average electrolyte resistivity.

Moreover, counter-electromotive forces caused by concentration may appear.

The sheets used to make known separators are disposed practically parallel to the electrodes, so that the micro channels filled with electrolyte have a more or less tortuous profile, are more or less aslant to electrodes surfaces, and are also more or less long. Moreover, when the separators are made of tangled fibres, the fibre tips or ends are either found on the edges of a woven sheet, or distributed at random in a felt.

One object and feature of this invention is to provide a separator constituted so as to promote the flow of the electrolysis products transferred by diffusion, and also the motion of the electrolyte, by rendering the path of transfer or motion as direct and short as possible, while increasing at most the effective section of the said path. The structure of the separator is such that nearly all the component fibres are oriented perpendicular, or almost perpendicular, to the surfaces of the electrodes. A further advantage of such an arrangement is to promote the transfer of the electrolysis products through the adsorbed layer existing on the surface of the fibres.

Within the scope of this invention, such a separator can be separately manufactured, but one of the objects of this invention consists in realizing the separator on the electrode itself. To this end a great number of fibres made of an insulating plastic material, unaltered by the electrolyte and practically insensible to the operating conditions prevailing in the cell are fixed on the surface of the electrode, either partly or completely, nearly perpendicular to the said surface. The said fibres may be fixed by an adhesive, e.g., previously deposited upon the appropriate face parts of the electrode, by any suitable method. This adhesive should advantageously have such physical properties as to stick to the electrode, to retain the plastic fibres, to be practically insensible to the operating conditions in the cell and to be permeable to electrolyte and electrolysis products. In this case, a very thin layer is deposited, its thickness being equal to only a small fraction of the space between two adjacent electrodes. The orientation and the laying or deposition of fibres perpendicular to the electrode surface can be accomplished by any known electrostatic techniques.

Among the many embodiments within the scope of the invention, a few will be mentioned: the surface of the electrodes of a given polarity is completely covered on both sides, then these electrodes are inserted between electrodes of the opposite polarity which have been left uncovered. In another embodiment, only one side of each electrode of both polarities is covered, then these electrodes are assembled so that a fibrous layer is always present between two electrodes of opposite polarity—in a third embodiment both sides of each electrode are covered.

Another advantage of this invention lies in the fact that such separators can play a part in protecting the stored electrodes before assembly. Moreover, the fibres may be colored so that a full range of colors provides the means for denoting either a particular polarity, or an electrode type or a date of manufacture, or any other indication required by the maker or the user. It is also possible to use the thin adhesive layer coating the electrode as a semi-permeable barrier if such a characteristic is especially needed.

The plastic fibres used within the scope of the invention have a diameter smaller than a few tenths of millimeter and a length not exceeding a few millimeters approximately. According to a preferred embodiment of the invention, the diameter is only a few hundredths of millimeter, and the length does not exceed 0.5 mm., this value being advantageously chosen as nearly equal to the depth of the space between adjacent electrodes considering the fact that the fibres will be bent or flattened down after close assembly.

The density of fibres on an electrode surface will control the free volume of electrolyte between the electrodes. It must also be noted that when the length of the fibres covering the surface of two adjacent electrodes is nearly equal to the distance between the electrodes, the resulting density of fibres after assembly will be twice that on each electrode since the said fibres interpenetrate. Moreover, this interpenetration leads to a mutual engagement of the electrodes so that any lateral shift is substantially prevented, a fact which can be useful in manufacturing or storing since electrodes can be stacked with a good mechanical stability, for instance.

Another interesting feature of the invention, when fibres are fixed on the electrodes, is its very simple application which makes automation very easy for manufacturing or makes storage battery assembly much simpler since no woven or felt separators have to be used and put in place and also since the electrodes can no more slip upon each other, and so on.

Obviously, this invention relates not only to separators with a special structure but also to the electrodes fitted with such separators, and to the electrochemical power sources, especially electric storage batteries, provided with such separators and/or such electrodes.

Other objects and features of the invention will become apparent from the following detailed description and the accompanying drawings, wherein:

FIGURE 3 is a diagrammatic view of a process embodiment; and

FIGURE 4 is a diagrammatic view of an electrochemical power source, e.g., a storage cell, constructed with the electrode separator arrangements of this invention.

Detailed description

Figure 1:
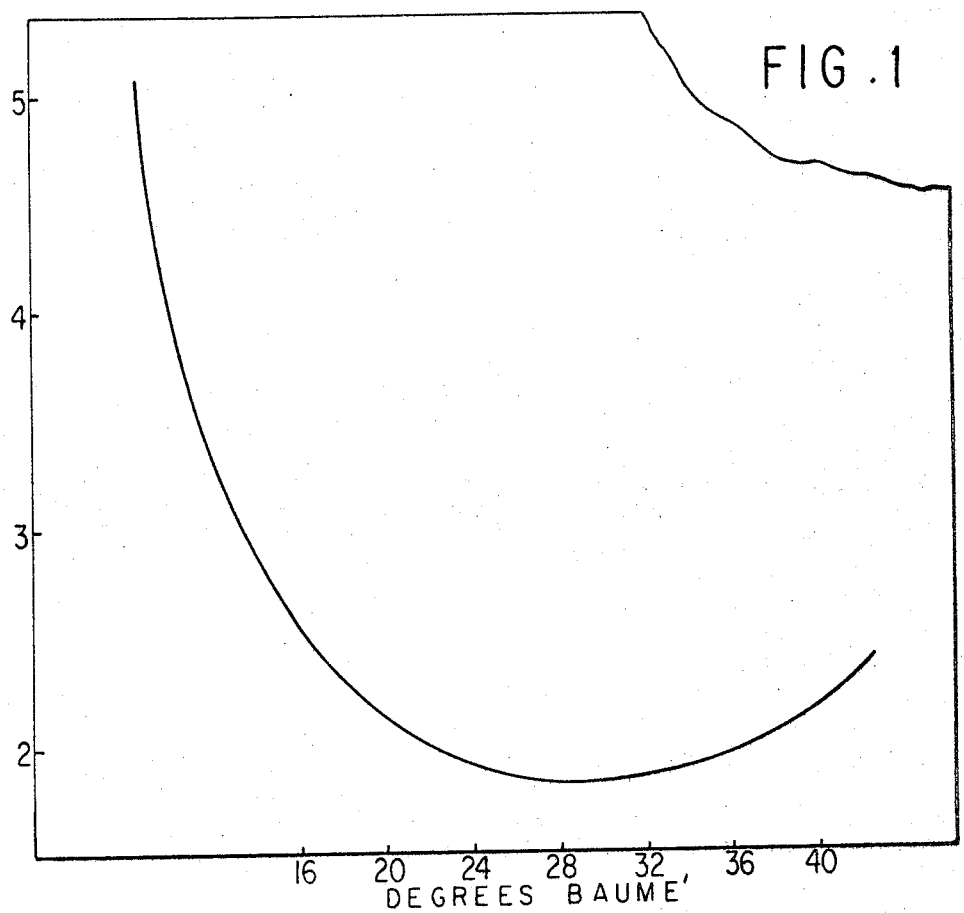
FIGURE 1 is a plot illustrating variations of the resistance, the ordinates being in ohm-centimeters and abscissae in degrees Baumé showing resistivity in ohm centimeters of a potassium hydroxide electrolyte as a function of concentration in degrees Baumé.

Referring to the drawings and first to FIGURE 1, it, for the purpose of better illustrating the variations of the resistance with the electrolyte concentration, e.g., in the case of alkaline storage cells, shows a curve giving the resistivity of a potassium hydroxide solution as a function of the concentration in degrees Baumé, since the commonly used electrolytes have a concentration substantially corresponding to the minimum resistivity of the solutions at rest, it can be seen that an increase or a decrease of the concentration of the said electrolyte always results in an increase of the resistivity. It can also be seen that on account of the curve's concavity, the increase of resistivity on one side of any other point than the lowest one is greater than the decrease of resistivity on the other side of the said point. The homogeneity of the electrolyte can be re-established only by the effects of diffusion phenomenon and electrolyte displacement due to convection.

Figure 2:
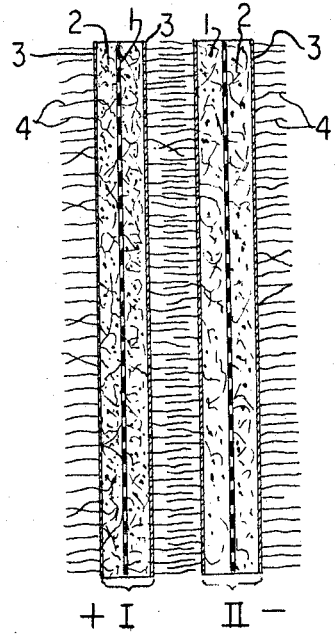
FIGURE 2 is a showing as a non-limitative example, in enlarged partial cross-section of an electrode-separator unit embodying the invention.

In FIGURE 2, the electrodes I and II, respectively positive and negative, the cross-section of which is illustrated at a large scale in FIGURE 2, are part of the electrode unit in an alkaline nickel cadmium cell. The carrier of each of these electrodes is a nickel plated perforated steel sheet 1. This carrier is covered with sintered nickel layers 2 impregnated with hydroxides corresponding to the required polarity, either nickel hydroxide eventually containing cobalt hydroxide for the positive electrode, or cadmium hydroxide for the negative electrode.

These electrodes as indicated diagrammatically in FIGURE 3, first are coated with thin layers 3, preferably homogeneous, of a solution mainly made of polyvinyl alcohol, the said layer being applied by immersion of the respective electrodes into the solution and then dripping them in an electrostatic field in order to improve uniformity. Before the adhesive layer has become too viscous, the electrodes are covered with plastic, e.g., polyamid fibres 4 by the use of an electrostatic device D of a known type. In this device D, an electrostatic generator G acts upon the polyamid (or similar) fibres of about two deniers diameter, maintained in a fluidized bed B, above a porous partition P through which air is forced by a blower placed under this partition. The said partition P and the fibre bed are situated under a grid energized to a very high potential (for example 90,000 volts) which attracts the electrified fibres by electrostatic influence. A portion of the fibres acquires a speed high enough to pass through the grid and their ends become adhered to the thin viscous film coating 3 of the electrode positioned above the grid and grounded. The fibres 4 are therefore oriented in such a way that their largest dimension, length in this case, is directed along the electric field lines of force, i.e., perpendicular to the adhesive film layers 3 and after the electric field has been cut off the fibres keep this oriented position. The period during which an electrode I or II is subjected to bombing by fibres controls the density of the fibre matting deposited and hence the free effective cross-section for passage of electrolysis products from one electrode to the adjacent one. This period of time can be experimentally determined in accord with particular requirements for a given electrochemical apparatus. When one face of an electrode I or II has had fibres electrostatically deposited on its layer 3, as described, it can be reversed and have similar fibres electrostatically deposited on its other face layer 3.

FIGURE 2 illustrates an example in which the plastic fibres have been deposited on both viscous layers 3 of the respective electrodes and have a length slightly less than the space between the positive and the negative electrodes, and shows how their interpenetration between adjacent electrodes which prevents any substantial relative motion of the electrodes in the transversal direction.

FIGURE 4 shows an electrochemical power source S, e.g., a storage cell utilizing positive and negative electrode separator arrangements in a casing Ca with requisite electrolyte (not shown) and a cover Co therefor. After interpenetrating assembly of the oriented fibres of respective electrodes, the latter are pressed together to effect said desirable closeness of spacing between the electrodes, the oriented interpenetrated fibres providing needed insulative separation.

While specific embodiments have been described, variations in practice within the scope of the appended claims are possible and are contemplated. There is no intention, therefore, of limitation to the exact disclosure herein presented.

What is claimed is:

1. An electrode separator arrangement for electrochemical power sources comprising an electrode and insulating fibres secured endwise to at least one face of said electrode so as to extend and be maintained in substantially perpendicular disposition relative to said face.

2. An electrode separator arrangement for an electrochemical power source according to claim 1, wherein said insulating fibres are secured endwise to both faces of said electrode.

3. An electrode separator arrangement for an electrochemical power source according to claim 1, including a thin binder layer on said face in which ends of said fibres are retained.

4. An electrode separator arrangement for an electrochemical power source according to claim 1, wherein both said fibres and said binder layer are of material unalterable during operation of said source.

5. An electrode separator arrangement for an electrochemical power source according to claim 1, wherein said fibres are insulative polyamids and said binder is polyvinyl alcohol.

6. An electrochemical power source comprising positive and negative electrodes, at least one of which is provided with insulating fibres secured to and projecting from at least one of its faces and oriented to extend substantially perpendicularly to said faces toward the adjoining face of the other electrode.

7. An electrochemical power source according to claim 6, including oriented fibres secured to each of the respective proximate faces of the electrodes and said fibres interpenetrate.

8. An electrochemical power source according to claim 7, including thin binder layers on said proximate faces of said electrodes in which ends of said oriented fibres are respectively bound, said interpenetrating fibres providing insulative separator means between the electrodes.

9. An electrochemical power source according to claim 8, wherein said oriented fibres and said binder layers are of material unalterable during operation of said source.

10. An electrochemical power source according to claim 6, wherein both faces of each electrode are provided with oriented insulating fibres.

11. An electrochemical power source according to claim 6, wherein some at least of the positive and negative electrodes are provided on both faces with oriented insulating fibres and others thereof are provided only on one face with oriented insulating fibres.

12. A process for preparing an electrode separator arrangement for an electrochemical power source comprising providing an electrode and applying a thin binder layer to at least one face thereof and electrostatically orienting and affixing insulating fibres to said binder layer so that said fibres extend substantially perpendicular in their lengthwise directions to said face.

13. A process for preparing an electrode-separator arrangement for an electrochemical power source according to claim 12 wherein said fibres are so oriented and affixed respectively to both faces of said electrode.

14. A process for preparing an electrode-separator arrangement for an electrochemical power source according to claim 12 comprising immersion of said electrode in a solution of said binder and thereafter allowing dripping of said solution from the electrode in the presence of an electrostatic field to effect uniformity of its distribution on the faces of said electrode.

References Cited

UNITED STATES PATENTS 3,033,909  5/1962  Urry _____ 136—63

FOREIGN PATENTS 467,696  6/1937  Great Britain.

WINSTON A. DOUGLAS, *Primary Examiner.*

DONALD L. WALTON, *Assistant Examiner.*

U.S. Cl. X.R.

136—120, 145, 176